(12) United States Patent
Chowdhury et al.

(10) Patent No.: US 6,728,443 B2
(45) Date of Patent: Apr. 27, 2004

(54) CHROMATIC DISPERSION AND DISPERSION SLOPE CONTROL METHOD AND APPARATUS

(76) Inventors: Dipakbin Qasem Chowdhury, 3030 Goff Rd., Corning, NY (US) 14830; Michal Mlejnek, 21 E. Chatfield Pl, Painted Post, NY (US) 14870

( * ) Notice: Subject to any disclaimer, the term of this patent is extended or adjusted under 35 U.S.C. 154(b) by 27 days.

(21) Appl. No.: 10/034,844

(22) Filed: Dec. 27, 2001

(65) Prior Publication Data

US 2003/0123794 A1 Jul. 3, 2003

(51) Int. Cl.[7] .................................................. G02B 6/34
(52) U.S. Cl. ...................... 385/37; 385/24; 385/123; 359/341.1; 398/121; 398/152
(58) Field of Search ........................... 385/14, 24, 27, 385/28, 37, 31, 123, 125, 127; 359/130, 161, 124, 173, 341.1; 372/6, 20, 102; 398/121, 152, 115, 164

(56) References Cited

U.S. PATENT DOCUMENTS

| 5,602,949 A | 2/1997 | Epworth ...................... 385/37 |
| 5,978,131 A | * 11/1999 | Lauzon et al. ................. 385/27 |
| 5,982,963 A | 11/1999 | Feng et al. .................... 385/37 |
| 5,999,679 A | 12/1999 | Antos et al. .................. 385/127 |
| 6,363,187 B1 | * 3/2002 | Fells et al. ..................... 385/37 |
| 6,381,388 B1 | * 4/2002 | Epworth et al. ............... 385/37 |

* cited by examiner

*Primary Examiner*—Phan T. H. Palmer
(74) *Attorney, Agent, or Firm*—Volentine Francos, PLLC (57) ABSTRACT

According to an exemplary embodiment of the present invention, an optical waveguide and method of use includes a grating which has a grating parameter that is adapted for dynamically variable non-uniform alteration. The non-uniform alteration of the grating parameter results in the introduction of a predetermined amount of chromatic dispersion and dispersion slope into an optical signal traversing the waveguide. According to another exemplary embodiment of the present invention, an optical apparatus and method of use includes a plurality of optical waveguides each of which have an optical grating and at least one of the waveguide gratings has a grating parameter that is adapted for dynamically variable non-uniform alteration. The optical apparatus further includes a device, which dynamically varies the grating parameters of each of the waveguides to selectively introduce chromatic dispersion and dispersion slope into an optical signal traversing the apparatus.

38 Claims, 3 Drawing Sheets

CHROMATIC DISPERSION AND DISPERSION SLOPE CONTROL METHOD AND APPARATUS

FIELD OF THE INVENTION

The present invention relates generally to optical transmission systems, and particularly to a method and apparatus for dynamically controlling chromatic dispersion and dispersion slope in optical communications systems using waveguide gratings.

BACKGROUND OF THE INVENTION

Optical transmission systems, including optical fiber communication systems, have become an attractive alternative for carrying voice and data at high speeds. In optical transmission systems, waveform degradation due to chromatic dispersion in the optical transmission medium can be problematic, particularly as transmission speeds continue to increase.

Chromatic dispersion (CD) results from the fact that, in general, in transmission media such as glass optical fibers, the higher the frequency of the optical signal, the greater the refractive index. As such, higher frequency components of optical signals will "slow down," and contrastingly, lower frequency signals will "speed-up."

In single mode optical fiber, chromatic dispersion results from the interplay of two underlying effects, material dispersion and waveguide dispersion. Material dispersion results from the non-linear dependence upon wavelength of the refractive index, and the corresponding group velocity, of the material, which is illustratively doped silica. Waveguide dispersion results from the wavelength dependent relationships of the group velocity to the core diameter and the difference in the index of refraction between the core and the cladding. Moreover, impurities in the waveguide material, mechanical stress and strain, and temperature can also impact the index of refraction, further contributing to the ill-effects of chromatic dispersion.

In digital optical communications, where the optical signal is ideally a square wave, bit-spreading due to chromatic dispersion can be particularly problematic. To this end, as the "fast frequencies" slow down and the "slow frequencies" in the signal speed up (or vice versa) as a result of chromatic dispersion, the shape of the waveform can be substantially impacted. The effects of this type of dispersion are a spreading of the original pulse in time, causing it to overflow in the time slot that has already been allotted to another bit. When the overflow becomes excessive, intersymbol interference (ISI) may result. ISI may result in an increase in the bit-error rate to unacceptable levels.

As can be appreciated, control of the total chromatic dispersion of transmission paths in an optical communication system is important, particularly in long-haul, and high-speed applications. To this end, it is necessary to reduce the total dispersion to a point where its contribution to the bit-error rate of the signal is acceptable. In commonly used dense wavelength division multiplexed (DWDM) optical communications systems, there may be 40 wavelength channels or more, having channel center wavelengths spaced approximately 0.8 nm to approximately 1.0 nm apart. Illustratively, a 40-channel system could have center wavelengths in the range of approximately 1530 nm to approximately 1570 mn. As can be appreciated, compensating for chromatic dispersion in such a system, and in a dynamic manner, can be difficult.

Another related phenomenon that can adversely impact signal transmission in an optical communications system especially at 40 Gb/s (or greater) transmission speeds is dispersion slope. Dispersion slope is the change (positive or negative) in dispersion versus wavelength. Sources of dispersion slope in optical communications systems include the dispersion from the optical waveguide (e.g. fiber); dispersion slope from optical components and equipment in the optical transmission system; and dispersion slope from thermal fluctuations. The control and correction of dispersion slope becomes increasingly important for high transmission rate systems operating with certain transmission formats. For instance, 40 Gb/s optical networks using RZ formats can be degraded when the received optical signal has 20 $ps/nm^2$ or more of chromatic dispersion slope.

Interferometric devices have been employed to mitigate the ill-effects of chromatic dispersion. One such interferometric device that is currently attracting a great deal of attention in the optical communications industry is the chirped fiber Bragg grating (FBG). The principle of operation of the FBG is relatively straight-forward. A grating is written down the length of an optical fiber waveguide by periodically changing the refractive index of the waveguide core or cladding. Light in the fiber which has a wavelength that is two times the product of the grating period and the index of refraction is reflected.

By altering the period of the grating the length of the device (referred to as "chirping" the grating), chromatic dispersion compensation can be realized. To this end, by chirping the grating, a relative wavelength-dependent delay may be introduced in the signal, enabling dispersion compensation. For example, if the period of the grating is reduced along the length of the device, blue light is reflected at a point farther into the device than red light, and is thus delayed relative to the red light. Alternatively, if the period of the grating were increased along the length of the device, the opposite relative delay would be had. As can be appreciated, the relative delay caused by chirped gratings can be used to compensate for chromatic dispersion present in an optical signal.

While the fiber Bragg gratings have been employed in dispersion compensation techniques, conventional Bragg grating-based dispersion compensators lack the capability of dynamically and tuneably controlling both dispersion compensation and dispersion slope in an optical signal.

What is needed, therefore, is a method and apparatus for controlling chromatic dispersion and dispersion slope in an optical signal that overcomes at least the drawbacks of conventional methods and apparati described above.

SUMMARY OF THE INVENTION

According to an exemplary embodiment of the present invention, an optical waveguide includes a grating which has a grating parameter that is adapted for dynamically variable non-uniform alteration. The non-uniform alteration of the grating parameter results in the introduction of a predetermined amount of chromatic dispersion and dispersion slope into an optical signal traversing the waveguide.

According to another exemplary embodiment of the present invention, a method of introducing chromatic dispersion and dispersion slope to an optical signal includes providing a waveguide having a grating parameter which is adapted for dynamically variable non-uniform alteration. The method further includes selectively varying the grating parameter to introduce a predetermined amount of chromatic dispersion and a predetermined amount of dispersion slope into an optical signal traversing the waveguide.

According to another exemplary embodiment of the present invention, an optical apparatus includes a plurality of optical waveguides each of which have an optical grating and respective grating parameters, and at least one of the waveguide gratings has a grating parameter that is adapted for dynamically variable non-uniform alteration. The optical apparatus further includes a device which dynamically varies the grating parameters of each of the waveguides to selectively introduce chromatic dispersion and dispersion slope into an optical signal traversing the apparatus.

According to another exemplary embodiment of the present invention, a method for introducing chromatic dispersion and dispersion slope in an optical signal includes providing a plurality of waveguides each having an optical grating with a respective grating parameters, and at least one of the waveguide gratings has a grating parameter that is adapted for dynamically variable non-uniform alteration. The method further includes dynamically varying the grating parameters of each of the waveguides to introduce a predetermined amount of chromatic dispersion, and a predetermined amount of dispersion slope into an optical signal traversing the waveguide.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Briefly, the present invention relates to a method and apparatus used to control chromatic dispersion and dispersion slope present in an optical signal. Illustratively, the apparatus may include at least one optical waveguide having a grating with a grating parameter which is adapted for dynamically variable non-uniform alteration to control the dispersion and dispersion slope present in an optical signal.

According to this illustrative embodiment, the chromatic dispersion present in an optical signal may be controlled by adjusting (tuning) the level of dispersion over a wavelength band; and the dispersion slope may be controlled by adjusting (tuning) the slope of the dispersion across the same wavelength band.

Illustratively, chromatic dispersion tuning is effected by altering the index of refraction, and/or the grating period in a Bragg grating (e.g. a fiber Bragg grating). Moreover, the adjustment of dispersion slope present in the optical signal may be effected by altering the index of refraction and/or the period of a Bragg grating (the product of which is referred to as the grating parameter of the grating). It is noted that the alteration of the index of refraction and/or the grating period may be effected by application of strain to the grating, by changing the temperature of the waveguide, and by illuminating the waveguide with a secondary light source when the index of refraction is photosensitive. It is further noted that these techniques may be used individually or in combination to achieve the desired end. Moreover, these techniques to alter the index and/or the period are merely illustrative, and other techniques may be employed to achieve this end.

Figure 1:
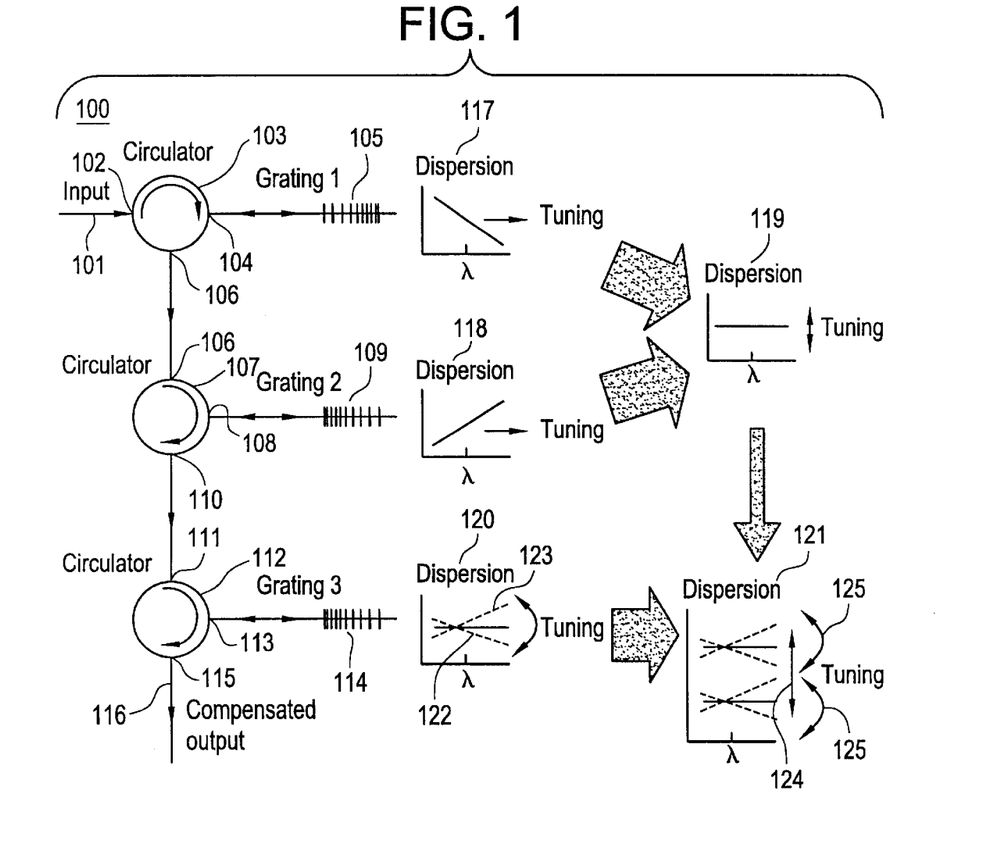
FIG. 1 is a schematic representation of a chromatic dispersion and dispersion slope control apparatus according to an exemplary embodiment of the present invention.

FIG. 1 shows a chromatic dispersion and dispersion slope controller 100 in accordance with an exemplary embodiment. An input optical signal 101 is incident upon a first port 102 of a first circulator 103. The input optical signal 101 is output via a second port 104 to a first grating 105.

The first grating 105 is illustratively a Bragg grating, for example a fiber Bragg grating. A spectral component in an optical signal with a wavelength that satisfies a Bragg phase-matching condition is reflected back from the first grating 105. Other spectral components are transmitted through the grating. Moreover, the Bragg phase-matching conditions at different positions in the fiber grating are differentiated by chirping the grating period of the first grating 105.

Quantitatively, the Bragg phase-matching conditions may be expressed as:

$$2n(z)\Lambda(z)=\lambda \tag{1}$$

where $n(z)$ is the index of refraction at a point z (where the z-axis is the optic axis), $\Lambda(z)$ is the period of the grating as a function of z, and $\lambda$ is the Bragg wavelength. When the grating period and the effective index of refraction satisfy the Bragg phase matching condition as set forth in equation (1) a spectral component having a wavelength $\lambda$ in the input optical signal 101 is reflected at a position z along the optical axis. Therefore, the Bragg wavelength $\lambda$ of the reflected wave varies with position z along the optic axis according to the grating parameter, $n(z)\Lambda(z)$.

As can be appreciated, therefore, different spectral components are reflected at different locations along the grating, and have different phase delays. For example, when the grating parameter, $n(z)\Lambda(z)$, increases with z, spectral components at shorter wavelengths are reflected back at locations before the spectral components at longer wavelengths. As will become more clear as the present description continues, this differential of points of reflection may be used to control the chromatic dispersion present in an optical signal. Moreover, tuning is effected by selectively altering the grating parameter $n(z)\Lambda(z)$ through alteration of the index of refraction, the grating period, or a combination thereof.

According to the illustrative embodiment shown in FIG. 1, the first grating 105 is a non-linearly chirped fiber Bragg grating. To wit, the first grating 105 is generally configured to having non-linearly chirped grating parameter n(z)Λ(z). As such, the grating parameter changes non-linearly with position z along the optic axis of the waveguide. This may be realized by non-linearly chirping the index of refraction, the grating period, or a combination of both.

The first grating 105 can be adjusted to change the reflection spectrum and the relative delays in the different reflective spectral components, enabling dynamic tuning of the chromatic dispersion present in an optical signal over a prescribed wavelength band. To this end, the grating parameter of the first grating 105 is illustratively altered in a uniform manner, resulting in an absolute (but not relative) alteration of the grating parameter. This uniform alteration is illustratively achieved through index variation induced by mechanical alteration (e.g. stress) or by varying the temperature of the grating, or by light exposure where the refractive index is sensitive to light.

The dispersion versus wavelength of the reflected components which are reflected along first grating 105 and are input into second port 104 are shown in graph 117. To avoid higher order dispersion variation within a particular wavelength band, a linear dispersion characteristic is particularly useful. To obtain a linear dispersion characteristic such as shown in graph 117, the grating period Λ(z) of equation (1) usefully varies as the square root of the distance along the grating. In the exemplary embodiment presently described, the grating period Λ(z) may be given by:

$$\Lambda(z)=\Lambda_0-\Delta[((z+c)/L)^{1/2}-\sqrt{1/2}] \quad (2)$$

where $\Lambda_0$ is the period for the Bragg center wavelength; L is the length of the grating; c is a constant; and the total chirp, Δ, is proportional to $\sqrt{L/S}$, where S is the slope of the linear dispersion, D, which is given by $$D(\lambda)=S(\lambda-\lambda_0) \quad (3)$$

where $\lambda_0$ is the center wavelength.

According to graph 117, first grating 105 exhibits a substantially linear dispersion characteristic with negative slope. The grating dispersion characteristic of first grating 105 may be tuned over a particular wavelength band. To this end, alteration of the grating period Λ(z), the index of refraction, n(z), or a combination thereof, can result in a change in the dispersion characteristic of the grating. Accordingly, by uniformly altering the grating period and/or the index of refraction along the grating, a shift in the dispersion curve is realized. This shift in the curve is shown as "tuning" in graph 117. It again is noted that the variation in the index of refraction and/or the grating period are illustratively accomplished by application of a uniform mechanical force to the grating, by uniformly varying the temperature of the first grating 105, by uniform light exposure to alter the index, or by a combination thereof.

As referenced above, the tuning of the dispersion curve of first grating 105 may be accomplished by radiative, thermal and/or mechanical perturbations to the grating. For example, when the grating is stretched, each grating pitch increases. As such, a phase-matched wavelength at each grating position increases. Therefore, the reflection spectrum shifts towards longer wavelengths. Accordingly, any differential group delay (DGD), which results in dispersion, is shifted as well. As will become more clear as the present description proceeds, this shifting of the differential group delay curve enables controlled tuning of the grating.

The wavelengths of the input signal 101 that are reflected by first grating 105 are input to second port 104 of first circulator 103. These are routed, as shown, to third port 126. These reflected spectral components are then incident upon a first port 106 of second circulator 107. The spectral components input to first port 106 are routed to second port 108 of second circulator 107. These are then routed to a second grating 109. The second grating 109 is substantially identical to the first grating 105. However, the second grating 109 is coupled to second port 108 such that the orientation of the second grating 109 is reversed with respect to the second port 108 when compared to the orientation of the first grating 105 with respect to the second port 104 of first circulator 103. As such, the variation in Bragg wavelength as a function of length along the length of second grating 109 is substantially the inverse of the Bragg wavelength as a function of length along the first grating 105.

Because of the inverse nature of the orientation of second grating 109 relative to first grating 105, the differential group delay of the spectral components incident upon second grating 109 is substantially the inverse of these components when incident upon first grating 105. This results in a dispersion curve which is linear, and has a slope of equal magnitude but opposite sign to that of the dispersion curve of first grating 105.

As shown in graph 118, the dispersion characteristic of second grating 109 is positive with increasing wavelength. Again, tuning of the grating, and thereby the dispersion curve, may be effected by application of a uniform mechanical force; uniform temperature alteration (application of a temperature gradient) of second grating 109; uniform illumination; or a combination thereof. The adjustment in the dispersion versus wavelength is a shift in the curve shown as "tuning" in graph 118. The reflected signal from second grating 109 is incident upon second port 108 of second circulator 107. This is then routed to a third port 110 and ultimately to first port 111 of third circulator 112.

The output at third port 110 is an optical signal which has undergone chromatic dispersion adjustment via first and second gratings 105 and 109, respectively. The resultant dispersion curve is shown in graph 119. The first and second gratings 105 and 109, respectively, have equal and opposite dispersion curves over a particular wavelength range. Accordingly, the dispersion characteristic is a substantially constant value over the particular wavelength range. This net dispersion as shown in graph 119 may be positive, negative, or zero, and its magnitude may be adjusted to a desired level by tuning as is shown. However, the dispersion slope over the particular wavelength band in zero. As described previously, it may be useful to adjust/control the dispersion slope in an optical signal.

The optical signal incident upon first port 111 of a third circulator 112 is routed to a second port 113. The optical signal is output from second port 113 and incident upon third grating 114. The optical components of third grating 114 are reflected according to the Bragg condition of the grating. As will become more clear as the description proceeds, the third grating 114 may be tuned through application of a mechanical force to the grating, thermal alteration of the grating, and illumination when the index of refraction of the guiding layer is photosensitive. Again, these illustrative techniques may be used alone or in combination.

Dispersion slope adjustment in accordance with an exemplary embodiment of the present invention is carried out using third grating 114. The third grating 114 is illustratively a non-linearly chirped fiber Bragg grating. It is noted, however, that the third grating 114 may be linearly chirped, and altered to a non-linearly chirped grating by thermal, mechanical or radiative alteration. Moreover, the third grating 114 may have a Bragg wavelength that is nonlinearly dependent on position along the optic (z) axis.

The third grating 114 is illustratively altered in a non-uniform manner. To this end, the alteration of the third grating 114 results in both an absolute alteration of the grating parameter (n(z)Λ(z)) as well as in a relative alteration of the grating parameter. Non-uniform alteration of the grating period and/or index of refraction of the grating 114 results in the ability to tune the slope of the dispersion curve for third grating 114. For example, as shown in graph 120, alteration of the index of refraction and/or grating period of third grating 114 enables the adjustment of the dispersion curve (shown as "tuning") which enables the adjustment of the dispersion slope. To this end, it may be useful to introduce a predetermined amount of negative slope to the optical signal. As such, tuning the dispersion curve to curve 122 may be useful. Alternatively, it may be useful to introduce positive slope to the optical signal. In this case, the dispersion curve would be tuned to curve 123. It is noted that the tuning of the dispersion slope symmetrically about a horizontal (e.g. graph 119), is carried out by non-uniform, local variation of the grating parameter n(z)Λ(z), to influence the index n(z) in the exemplary embodiment shown in FIG. 1. The non-uniform alteration of the grating parameter of grating 114 may be effected by non-uniform temperature variation, non-uniform mechanical (stress) variation, and non-uniform illumination when the index of refraction of the waveguide is photosensitive. Again, these techniques may be applied individually or in combination.

The optical components which are reflected from third grating 114 are again incident upon second port 113 of third circulator 112. These optical components are routed then to a third optical port 115, and constitute the output signal 116 of the chromatic dispersion and dispersion slope controller 100.

The chromatic dispersion and dispersion slope controller 100 of the exemplary embodiment of FIG. 1 incorporates three fiber Bragg gratings to adjust the chromatic dispersion and dispersion slope so that output signal has a predetermined amount of chromatic dispersion and dispersion slope. The ability to tune the chromatic dispersion and dispersion slope over a particular wavelength band is one advantageous aspect of the present invention. As shown in graph 121, the adjustment in the grating periods and/or the indices of refraction of first, second and third gratings 105, 109, and 114, respectively, enables the tuning of the magnitude (shown at 124) as well as of the slope (shown at 125) of the optical signal.

Figure 2:
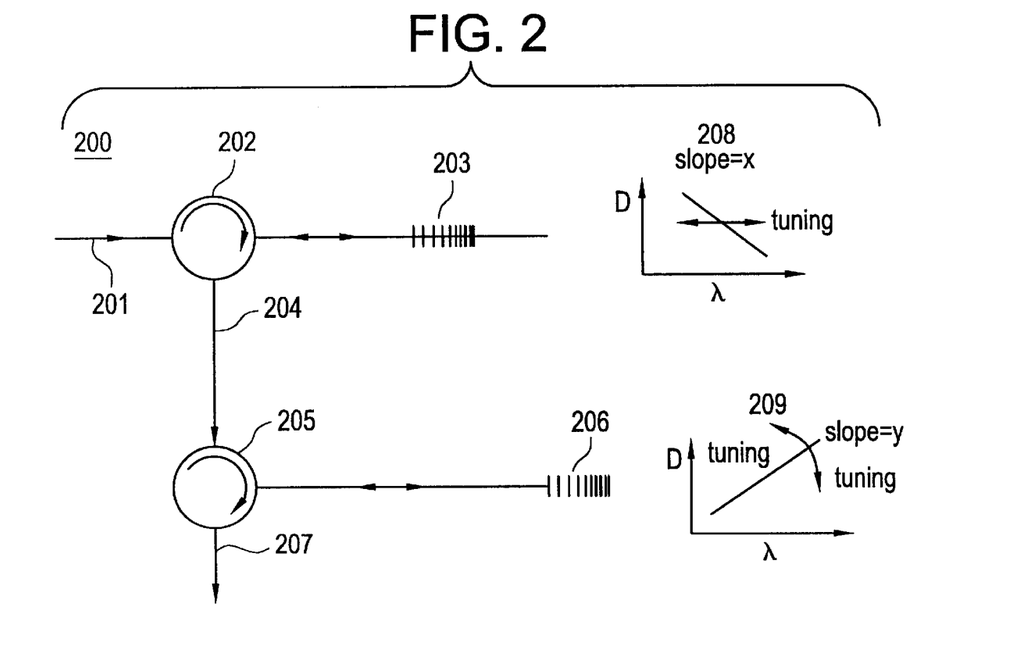
FIG. 2 is a schematic representation of a chromatic dispersion and dispersion slope control apparatus according to an exemplary embodiment of the present invention.

Another exemplary embodiment of the present invention is shown in FIG. 2. The exemplary embodiment is similar to that shown in FIG. 1. As such, only differences therebetween are described in detail, and similarities are omitted in interest of brevity. In the present illustrative embodiment, a first grating 203 which is non-linearly chirped enables the magnitude of the dispersion of input signal 201 to be varied by tuning as shown in graph 208. In this example, the slope of the dispersion (D) versus wavelength (λ) is negative, having a magnitude "x." Upon emergence from circulator 202, signal 204 is incident upon second circulator 205, and is routed through to second grating 206. Second grating 206, is also non-linearly chirped, but is spatially reversed relative to first grating 203. Second grating 206 has an initial positive dispersion slope of magnitude "y." (This slope is similar in magnitude and sign to grating 109 of FIG. 1).

The output signal 207 is adjusted for both dispersion and dispersion slope in a manner similarly described in connection with the exemplary embodiment of FIG. 1. In the exemplary embodiment of FIG. 2, the grating parameter of the first grating 203 is uniformly perturbed in a manner described previously to effect dispersion compensation in a tuneable manner of the wavelength band. To wit, the dispersion compensation by first grating 203 has a slope "x," and a variable magnitude effected by "tuning" as shown in graph 209. The grating parameter of the second grating 206 is non-uniformly altered using thermal, stress and illumination perturbations, or a combination thereof, and enables dispersion slope compensation in a tuneable manner. These perturbation techniques are illustratively non-uniform and are effected similarly to those described above in connection with the exemplary embodiment of FIG. 1, and as described below. The first grating 203 is similar to first grating 105 of FIG. 1, and second grating 206 is similar to second grating 109 of FIG. 1. Second grating 206 has an initial slope "y" and may be tuneably altered (shown as "tuning" in graph 209) with the resultant slope of output signal 207 being equal to the difference (x−y), again in a tuneable manner. (It is noted that the difference (x−y) can be positive, negative or zero and may be symmetric about nullity).

As can be readily appreciated, the first grating 203 may have a fixed slope and the second grating 206 may have a tuneable slope. Of course, both could have variable slope, or the first grating 203 could be variable, and the second grating 206 could have a fixed slope. Moreover, the magnitude of the dispersion of the output signal can be positive, negative, or zero through suitable tuning of first and second gratings 203 and 206, respectively, using techniques described in detail above. Finally, it is noted that first grating 203 or second grating 205 may be linearly chirped and non-uniformly perturbed to effect dispersion and dispersion slope compensation. Again, the perturbation may be thermal, mechanical or by illumination.

In order to alter the dispersion slope in a controlled manner, alteration of the index of refraction and/or the grating period may be effected by application of an external force resulting non-uniform stress and/or non-uniform alteration of the temperature of the grating. Typical stress in fiber gratings amounts to 1–2% for the local change in the grating period (ΔΛ/Λ); and the temperature gradient between the ends of the grating can be approximately 100° C. and greater (within the limits of stability and strength).

For purposes of quantitative illustration, according to an exemplary embodiment of the present invention, the chromatic dispersion and dispersion slope controller 200 may operate over a bandwidth of approximately 0.2 nm to approximately 0.7 nm. The first grating 203 and second grating 206 each have a dispersion magnitude of approximately of approximately 190 ps/nm$^2$ in the present illustrative embodiment. Moreover, the adjustment in chromatic dispersion over this bandwidth is in the range of approximately −750 ps/nm to approximately +750 ps/nm for an illustrative 0.2 nm bandwidth to approximately −300 ps/nm to approximately +300 ps/nm for an illustrative 0.7 nm bandwidth. The control of dispersion slope over the illustrative bandwidth is in the range of approximately 1250 ps/nm$^2$ for a bandwidth of approximately 0.7 nm, to approximately 180 ps/nm$^2$ for a bandwidth of approximately 1.6 nm. It is noted that the illustrative dispersion slope values are based on the overall temperature gradient of 100° C. from one end of the grating to the other. Moreover, it is noted that the dispersion slope tuning is illustratively positive. Negative dispersion slope gratings can be also constructed by spatially reverting the positive dispersion slope gratings. It is further noted that the above performance data are merely illustrative of the present invention, and that symmetric tuning of the dispersion slope on the order of magnitude of approximately ± hundreds of ps/nm$^2$ are possible according to the present illustrative embodiment. Finally, in the illustrative embodiment where a grating is linearly chirped and non-uniformly altered, using mechanical alteration, dispersion slope compensation of approximately ±100 ps/nm$^2$ may be realized; and using thermal alteration dispersion slope compensation of ± tens of ps/nm$^2$ may be realized.

Figure 3:
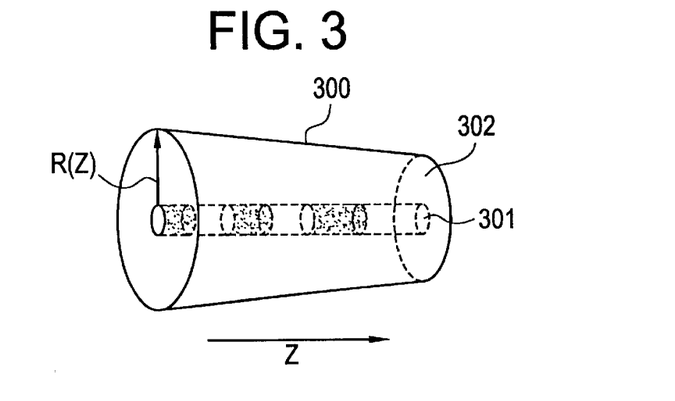
FIG. 3 is a perspective view of an optical waveguide having a Bragg grating written in the guiding layer of the waveguide in accordance with an exemplary embodiment of the present invention.

An exemplary waveguide having a therein to grating controllably adjust dispersion slope is shown in FIG. 3. The waveguide grating 300 includes a core 301 and a cladding 302. In accordance with the exemplary embodiment shown in FIG. 3, a fiber-Bragg grating is employed. As such, the waveguide is a substantially cylindrical waveguide having a grating in the core 301. However, the cladding layer 302 tapers for reasons described more fully herein and without significantly affecting the propagation mode. Of course, this is merely exemplary of waveguide gratings which may be used to controllably alter the dispersion slope in an optical signal in accordance with the present invention. For example, planar waveguides including rectangular and square waveguides, may be used to achieve this desired result. Moreover, the cladding layers of these alternative waveguides may have a thickness that tapers along length of the optic axis. Finally, it is noted that the tapering of the cladding layer (particularly in non-cylindrical waveguides) may be symmetric, or asymmetric about the optic axis, thereby being ultimately adapted for non-uniform variation of the grating parameter by the illustrative techniques described herein.

In the exemplary embodiment shown in FIG. 3, the grating in the core layer 301 is a substantially non-linearly chirped fiber Bragg grating 303. This fiber Bragg grating exhibits substantially linear dispersion characteristics, which may be changed by the application of a non-uniform strain, the application of a non-uniform temperature profile the non-uniform application of light radiation, or a combination thereof, to the waveguide grating 300. It is noted that the former can be achieved by applying a force along the axial direction (z-direction) of the waveguide grating 300. Due to the tapering of the cladding layer, the strain exerted is non-uniform. Moreover, the application of a non-uniform temperature profile or a non-uniform radiation field to the waveguide grating 300 has the same effect on the differential group delay and, therefore, the dispersion slope of the optical signal traversing waveguide grating 300. By any technique, both the absolute and relative grating period and/or indices of refraction are changed, resulting in controlled variation of the dispersion slope.

As described above, alteration of the grating period and/or the indices of refraction of waveguide grating 300 enables the selective alteration of the differential group delay of the reflected optical components. Ultimately, this results in the controlled adjustment of the dispersion slope. Isolating for the purposes of illustration, the alteration of the grating using a mechanical force, it can be shown that application of force along the z-axis will result in a change in the grating period, which can be represented by:

$$\Lambda'(z) = \Lambda(z)[1 + \epsilon(z)] \quad (4)$$

where $\Lambda'(z)$ is the period of the grating upon application of a force along the optic (z) axis, $\Lambda(z)$ is the period before application of the force, and $\epsilon(z)$ is the magnitude of the strain, given by:

$$\vec{\epsilon}(z) = \frac{\vec{\sigma}}{E} \quad (5)$$

where E is Young's modules, and $\vec{\sigma}(z)$ is the stress as a function of z, given by:

$$\vec{\sigma}(z) = \frac{\vec{F}}{\pi R^2(z)} \quad (6)$$

where $\vec{F}$ is the force and R(z) is the radius of the waveguide at a point z.

As can be appreciated from a review of equations (4) and (5), application of a uniform force, F, along the z-axis (optical axis) of the waveguide grating 300 results in a non-uniform alteration of the waveguide period $\Lambda'(z)$. This can be readily understood from a review of equation (5), where the resultant strain on the waveguide grating 300 varies inversely with the square root of the radius, which varies as a function of z. As can be appreciated, at a point where the radius is smaller due to the tapering of the cladding, the strain, $\vec{\sigma}(z)$, is greater than at a point where the radius is larger. This translates into a greater strain, and accordingly a greater grating period as a function of position $(\Lambda'(z))$. Ultimately, the application of a uniform force along the z-direction results in a non-uniform alteration of the grating period, $\Lambda'(z)$, which results in the absolute and relative variation of the grating period (pitch) as a function of position along the z-axis. As mentioned previously, achievable $\Delta\Lambda/\Lambda$ can be few percent (1–2%). For purposes of illustration and not limitation, it is noted that the derivative of index of refraction with respect to the temperature (dn/dT) is typically $7.8 \times 10^{-6}$/degree C. From this derivative, the change in the index, $\Delta n$, can be determined.

Figure 4A:
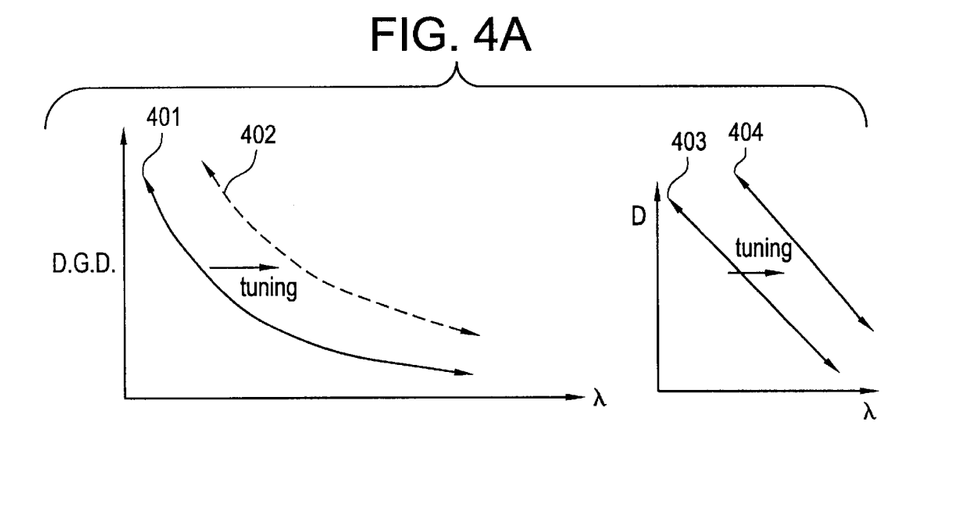
FIG. 4(a) is a graph of differential group delay versus wavelength.
Figure 4B:
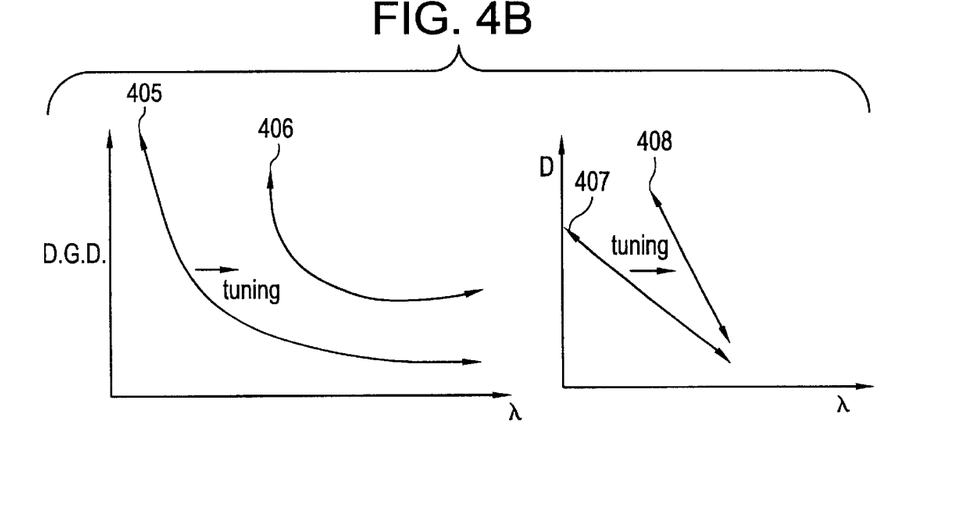
FIG. 4(b) is a graphic representation of differential group delay versus wavelength in accordance with an exemplary embodiment of the present invention.

The effect of the non-uniform alteration of the grating period of the waveguide grating 300 is most readily understood through a review of FIGS. 4(a) and 4(b).

In FIG. 4(a), graphs of the differential group delay (DGD) and dispersion (D)

$$\left(\frac{\partial DGD}{\partial \lambda}\right),$$

respectively, versus wavelength $\lambda$ are shown for a non-linear chirped fiber Bragg grating which has undergone tuning by alteration of the index of refraction and/or the grating period. For example, non-linear fiber Bragg grating is stretched, each grating pitch increases. As such, a phase-matched wavelength at each grating position increases. Therefore, the reflection spectrum shifts towards longer wavelengths. This shift is shown by "tuning" with the shift from first curve 401 to second curve 402.

Since the grating period of fiber Bragg grating is non-linearly chirped, the delay of the reflected spectral components also has a non-linear dependence on the position z (optic axis) of the waveguide. In addition, a change in the overall waveguide length produces different changes in the grating period at different positions along the grating. This results in different relative delays for different wavelengths that satisfy the Bragg phase-matching condition. Ultimately, the shift in the DGD enables a tunable dispersion adjustment as shown in the graph in FIG. 4(a) of dispersion (D) versus wavelength. To wit, prior to application of a mechanical force, the dispersion versus wavelength is a linear function with negative slope shown as curve 403. After application of the mechanical force, the curve is shifted to curve 404. However, it is noted that the slope of curve 404 is identical to the slope of curve 403. As such, no adjustment in dispersion slope may be achieved using the non-linear chirped fiber Bragg grating represented in FIG. 4(a). It is noted that the differential group delay adjustment and corresponding dispersion tuning shown illustratively in FIG. 4(a) is representative of the shifts in these curves for the first and second gratings 105 and 109, respectively, of the exemplary embodiment of FIG. 1; and of the first grating 203 of the exemplary embodiment of FIG. 2.

In contrast, the differential group delay and dispersion versus wavelength graphs which are shown in FIG. 4(b) are representative of the waveguide grating according to an exemplary embodiment of the present invention. For example, the waveguide grating 300 shown in FIG. 3 may have a force apply along the z-axis. This will result in a non-uniform strain placed on the grating, and ultimately will result in alteration of the grating period ($\Lambda'(z)$), as described previously. In particular in accordance with the presently described illustrative embodiment, both the absolute and relative pitch are altered. This results not only in a shift in the differential group delay, but also a change in the radius of curvature of the quadratic differential group delay curve.

Prior to alteration of the waveguide or indices of refraction, the differential group delay is represented by curve 405. However, after the application of a force along the z-direction, the differential group delay versus $\lambda$ is given by curve 406, which has a different radius of curvature than does curve 405. The curve 406 has been "tuned" in both magnitude and slope by application of the force. The dispersion (D) versus wavelength for the differential group delay (DGD) represented by curves 405 and 406, are represented by curves 407 and 408, respectively. As can be appreciated from a review of FIG. 4(b), "tuning" of the waveguide grating results in a shift in the dispersion curve, as well as a change in the slope of the dispersion. Accordingly, this enables the controlled and selective adjustment of the dispersion slope.

While the above description substantially surrounds application of a mechanical force along the axis of the waveguide grating, it is noted that forces in other directions (e.g. curvilinear forces) may also be employed. Moreover, it is once again noted temperature variation and/or application of light radiation (where the index of refraction is sensitive to light) as described above will have a substantially identical effect on the dispersion and dispersion slope of a waveguide in accordance with an exemplary embodiment of the present invention.

For purposes of illustration, according to an exemplary embodiment of the present invention, a waveguide having a tapered cladding such as shown in FIG. 3, achieves a variation in dispersion slope in the range of approximately 190.5 ps/nm² to approximately 183.5 ps/nm² for a constant temperature gradient of ±1° C. along a 100 mm length wavguide grating. The shift in the spectrum in the present example is approximately 0.035 nm. Using strain tuning of the tapered cladding waveguide grating, similar results are achieved.

The invention having been described in detail in connection through a discussion of exemplary embodiments, it is clear that modifications of the invention will be apparent to one having ordinary skill in the art having had the benefit of the present disclosure. Such modifications and variations are included in the scope of the appended claims.

We claim:

1. An optical waveguide, comprising:
a grating having a grating parameter which is adapted for dynamically variable non-uniform alteration, wherein said non-uniform alteration of said grating parameter results in the controlled introduction of a predetermined amount of chromatic dispersion and dispersion slope into an optical signal traversing the waveguide.

2. An optical waveguide as recited in claim 1, wherein said dynamically variable non-uniform alteration results in a relative change in a pitch of said grating.

3. An optical waveguide as recited in claim 2, wherein said grating is a non-linearly chirped grating.

4. An optical waveguide as recited in claim 2, wherein said grating parameter further comprises the product of an index of refraction and a grating pitch, each of which vary with a position, z, along an optic axis.

5. An optical waveguide as recited in claim 2, wherein said grating is a Bragg grating.

6. An optical waveguide as recited in claim 1, wherein the optical waveguide has at least one cladding layer which has a thickness which tapers as a function of position along an optic axis of the waveguide.

7. An optical waveguide as recited in claim 6, wherein the optical waveguide is a planar waveguide having a planar guiding layer.

8. An optical waveguide as recited in claim 1, wherein said dynamically variable non-uniform alteration is effected by application of one of the group consisting essentially of a non-uniform strain along an optic axis of the optical waveguide; a non-uniform temperature gradient along said optic axis of the optical waveguide; and a non-uniform light radiation source along said optic axis of the optical waveguide.

9. An optical waveguide as recited in claim 1, wherein the optical waveguide has a cladding layer having a radius that tapers as a function of position along an optic axis of the waveguide.

10. A method of introducing chromatic dispersion and dispersion slope to an optical signal, the method comprising:
providing an optical waveguide having a grating with a grating parameter; and
dynamically non-uniformly varying said grating parameter to controllably introduce a predetermined amount of the chromatic dispersion and a predetermined amount of dispersion slope into an optical signal traversing said waveguide.

11. A method as recited in claim 10, wherein said dynamically non-uniformly varying of said grating parameter results in a relative change in a pitch of said grating.

12. A method as recited in claim 11, wherein said grating is a non-linearly chirped grating.

13. A method as recited in claim 11, wherein said grating parameter further comprises the product of an index of refraction and a grating pitch, each of which vary with a position, z, along an optic axis.

14. A method as recited in claim 11, wherein said grating is a Bragg grating.

15. A method as recited in claim 10, wherein said optical waveguide has a least one cladding layer which has a thickness which tapers as a function of position along an optic axis of said optical waveguide.

16. An optical waveguide as recited in claim 15, wherein said waveguide is a planar waveguide having a planar guiding layer.

17. A method as recited in claim 10, wherein said dynamically non-uniformly varying of said grating parameter is effected by application of one of the group consisting essentially of: non-uniform strain along an optic axis of said optical waveguide; a non-uniform temperature gradient along said optic axis of said optical waveguide; and a non-uniform light radiation source along said optic axis of said optical waveguide.

18. A method as recited in claim 10, wherein said optical waveguide has a cladding layer having a radius that tapers as a function of position along an optic axis of said optical waveguide.

19. An optical apparatus, comprising:
a plurality of optical waveguides each of which have a grating and at least one of which has a grating with a grating parameter that is adapted for dynamically variable non-uniform alteration; and
a device which dynamically and non-uniformly varies said grating parameter of said at least one waveguide to controllably introduce chromatic dispersion and dispersion slope into an optical signal traversing the waveguide.

20. An optical apparatus as recited in claim 19, wherein said dynamic and non-uniform varying results in a relative change in a pitch of said grating.

21. An optical apparatus as recited in claim 20, wherein said grating of said at least one waveguide is a non-linearly chirped grating.

22. An optical apparatus as recited in claim 20, wherein said at least one of said plurality of waveguides have a linearly-chirped grating, and at least another of said plurality of waveguides have a non-linearly chirped grating.

23. An optical apparatus as recited in claim 20, wherein each of said plurality of waveguides has a non-linearly chirped grating.

24. An optical waveguide as recited in claim 19, wherein said optical waveguide has at least one cladding layer that has a thickness which tapers as a function of position along an optic axis of said waveguide.

25. An optical apparatus as recited in claim 24, wherein said waveguide is a planar waveguide having a planar guiding layer.

26. An optical apparatus as recited in claim 19, wherein said optical waveguide has a cladding layer having a radius that tapers as a function of position along an optic axis of said optical waveguide.

27. An optical apparatus as recited in claim 19, wherein said gratings are fiber Bragg gratings (FBG).

28. An optical waveguide as recited in claim 19, wherein said dynamically and non-uniformly varying of said grating parameter is effected by application of one of the group consisting essentially of: a non-uniform strain along an optic axis of the optical waveguide; a non-uniform temperature gradient along said optic axis of the optical waveguide; and a non-uniform light radiation source along said optic axis of the optical waveguide.

29. A method for introducing chromatic dispersion and dispersion slope in an optical signal, the method comprising:

providing a plurality of optical waveguides each of which have a grating, and at least one of which has a grating with a grating parameter which is adapted for dynamically variable non-uniform alteration; and providing a device which dynamically non-uniformly varies said grating parameter to controllably introduce a predetermined amount of chromatic dispersion and a predetermined amount of the dispersion slope into an optical signal traversing the waveguide.

30. A method as recited in claim 29, wherein said dynamically variable non-uniform alteration results in a relative change in a pitch of said grating.

31. A method as recited in claim 30, wherein said grating of said at least one waveguide is a non-linearly chirped grating.

32. A method as recited in claim 30, wherein at least one of said plurality of waveguides have a non-linearly chirped grating and wherein at least another of said plurality of waveguides is a linearly chirped grating.

33. A method as recited in claim 30, wherein each of said plurality of waveguides has a non-linearly chirped grating.

34. A method as recited in claim 29, wherein said optical waveguide has at least one cladding layer which has a thickness which tapers as a function of position along an optic axis of said optical waveguide.

35. A method as recited in claim 34, wherein said optical waveguide is a planar waveguide having a planar guiding layer.

36. A method as recited in claim 29, wherein said dynamically variable non-uniform alteration is effected by application of one of the group consisting essentially of: a non-uniform strain along an optic axis of said optical waveguide; a non-uniform temperature gradient along said optic axis of said optical waveguide; and a non-uniform light radiation source along said optic axis of said optical waveguide.

37. A method as recited in claim 29, wherein said optical waveguide has a cladding layer having a radius that tapers as a function of position along an optic axis of said optical waveguide.

38. A method as recited in claim 29, wherein said gratings are fiber Bragg gratings (FBG).

* * * * *

UNITED STATES PATENT AND TRADEMARK OFFICE
CERTIFICATE OF CORRECTION

PATENT NO.   : 6,728,443 B2
DATED        : April 27, 2004
INVENTOR(S)  : Mlejnek Michal et al.

It is certified that error appears in the above-identified patent and that said Letters Patent is hereby corrected as shown below:

<u>Title page,</u>
Item [56], References Cited, U.S. PATENT DOCUMENTS, insert the following:

-- US 2003/0081891 A1    5/1/2003    Schneider et al       385/27
   US 2002/0181878 A1    12/5/2002   Schneider et al       385/50
   US 2002/0181860 A1    12/5/2002   Weller-Brophy et al   385/24
   US 2002/0181879 A1    12/5/2002   Bickham et al         385/50 --

Signed and Sealed this

Thirteenth Day of July, 2004

JON W. DUDAS
*Acting Director of the United States Patent and Trademark Office*